US006685403B2

(12) United States Patent
Constantin

(10) Patent No.: US 6,685,403 B2
(45) Date of Patent: Feb. 3, 2004

(54) UNIVERSAL RESTRAINT SYSTEM

(76) Inventor: Bruce J. Constantin, 2001 Wooddale Blvd., Baton Rouge, LA (US) 70806

( * ) Notice: Subject to any disclaimer, the term of this patent is extended or adjusted under 35 U.S.C. 154(b) by 0 days.

(21) Appl. No.: 10/242,923

(22) Filed: Sep. 13, 2002

(65) Prior Publication Data

US 2003/0012617 A1 Jan. 16, 2003

Related U.S. Application Data

(62) Division of application No. 09/727,329, filed on Nov. 29, 2000, now Pat. No. 6,474,916.

(51) Int. Cl.$^{7}$ .................................................. B60P 7/08
(52) U.S. Cl. ................................. 410/7; 410/4; 410/77
(58) Field of Search ................................ 410/3, 4, 7, 9, 410/19, 22, 51, 77; 296/65.04; 297/DIG. 4; 280/304.1; 248/503, 503.1

(56) References Cited

U.S. PATENT DOCUMENTS

| | | | | | |
|---|---|---|---|---|---|
| 4,062,209 | A | | 12/1977 | Downing et al. | |
| 4,588,340 | A | * | 5/1986 | Howard | 410/7 |
| 4,601,620 | A | * | 7/1986 | Bugger et al. | 410/22 |
| 4,623,289 | A | | 11/1986 | Apostolos | 410/7 |
| 4,671,713 | A | * | 6/1987 | Lenkman | 410/7 |
| 4,690,364 | A | | 9/1987 | Constantin | |
| 4,730,964 | A | | 3/1988 | Joyner | 410/23 |
| 4,754,946 | A | | 7/1988 | Constantin | |
| 4,805,954 | A | | 2/1989 | Lazaroff | |
| 4,973,022 | A | | 11/1990 | Mayland | |
| 5,186,585 | A | * | 2/1993 | Sousa et al. | 410/9 |
| 5,344,265 | A | | 9/1994 | Ullman et al. | 410/3 |
| 5,489,170 | A | * | 2/1996 | Inoue et al. | |
| 5,567,095 | A | | 10/1996 | James et al. | 410/7 |
| 5,628,022 | A | | 5/1997 | Harris | 410/7 |
| 5,888,038 | A | * | 3/1999 | Ditch et al. | 410/7 |
| 6,036,417 | A | | 3/2000 | Weaver | 410/7 |
| 6,077,004 | A | | 6/2000 | Denman, Jr. | 410/8 |
| 6,113,325 | A | | 9/2000 | Craft | 410/7 |
| 6,149,359 | A | * | 11/2000 | Cardona | 410/11 |
| 6,171,035 | B1 | * | 1/2001 | McLaurin et al. | 410/7 |
| 6,231,283 | B1 | * | 5/2001 | Stowers | 410/9 |
| 6,287,060 | B1 | * | 9/2001 | Girardin | 410/7 |
| 6,474,916 | B2 | * | 11/2002 | Constantin | 410/7 |

FOREIGN PATENT DOCUMENTS

| | | | |
|---|---|---|---|
| DE | 3423646 | A1 | 1/1986 |

* cited by examiner

*Primary Examiner*—Stephen T. Gordon
(74) *Attorney, Agent, or Firm*—André J. Porter; John H. Runnels; Bonnie J. Davis

(57) ABSTRACT

A universal, mobile occupant carrier, restraint device that may be adapted to fit various commercially available mobile occupant carriers. The restraint device allows the occupant to perform self-securement in a transport vehicle while providing resistance against multi-point collisions.

5 Claims, 3 Drawing Sheets

UNIVERSAL RESTRAINT SYSTEM

This is a divisional of prior application Ser. No. 09/727,329, filed Nov. 29, 2000, now U.S. Pat. No. 6,474,916.

This invention pertains to a universal restraint system designed to be an inexpensive device for effectively securing a small, mobile occupant carrier, such as an occupied wheelchair or other small-sized wheeled carriers, within a transport vehicle.

There is an increased awareness and concern for the safety of occupants of mobile occupant carriers being transported in vehicles. Various mobile occupant carrying devices are known which allow physically disabled people to travel independently, such as wheelchairs, three-wheeled scooters, power bases, etc. There are many instances where an occupant of such a device, for safety or other reasons, must secure it to a surrounding structure, for example, when the occupant boards a vehicle such as a van, bus, or train. Safety laws usually require that the vehicle be equipped with a device for securing the mobile occupant carrier within the vehicle. The problem for designers of mobile occupant carrier systems is to design occupant carrying devices with superior, fail-safe securing capability, while at the same time being easy and quick to operate by both the occupant of the mobile occupant carrier and the vehicle's driver. See U.S. Pat. Nos. 4,973,022 and 5,344,265.

Many wheelchair restraint systems are difficult or impossible for a wheelchair occupant to use unassisted. Even with help, it may take several minutes to secure a single wheelchair, causing substantial delays. See U.S. Pat. No. 4,973,022.

U.S. Pat. No. 6,113,325 describes a wheelchair restraint device for a mass transportation vehicle. The device includes a three-point anchoring system comprising a rear wheelchair attachment assembly, a personal securing belt assembly, and a front wheelchair attachment assembly.

U.S. Pat. No. 5,628,595 describes a wheelchair lock-down device for securing a wheelchair to the floor of a vehicle. The device comprises a locking mechanism mounted to the floor of a vehicle and a bar mounted to the underside of the wheelchair. The locking mechanism includes a stationary locking structure that has a pivoting locking arm and a slot capable of receiving the bar.

U.S. Pat. No. 5,567,095 describes a vehicular mobile occupant carrier system for transport in a transit vehicle, comprising a mobile occupant carrier and an upstanding securing stanchion mounted to the floor of the vehicle for securing the mobile occupant carrier.

U.S. Pat. No. 5,344,265 describes a securing device for a rollable mobility aid. The device comprises a protruding structure attached to and extending outwardly from the mobility aid frame, which includes an operative structure having a vertical, broad engaging expanse located external of the mobility aid rollers, and an upright receiver structure, attached to the transit vehicle, having a vertical, broad receiving region.

U.S. Pat. No. 4,973,022 describes a device for securing a wheelchair to the floor of a vehicle, comprising two pairs of clamp posts, each having a pair of clamp jaw members positioned to engage the wheelchair underframe.

U.S. Pat. No. 4,805,954 describes a clamping device for securing a wheelchair to the base of a motor vehicle. The device comprises a housing secured to the floor of a motor vehicle and a movable clamp pivotally attached to the device that attaches to the wheelchair frame by a clamping adapter attached to the underside of the wheelchair.

U.S. Pat. No. 4,730,964 describes an electromechanical system for securing a wheelchair to the floor of a transportation vehicle. The device includes a single automated tie-down comprising a latching device mounted to the floor of a vehicle, a tie-down bracket bolted on a wheelchair, and adjustable chocks to secure the wheelchair in place.

U.S. Pat. No. 4,623,289 describes a device for releasably holding a wheelchair in a predetermined position on the floor of a vehicle. The device comprises a transverse backstop attached to the floor, vertical plates having forward ends extending longitudinally from the base of the wheelchair, and a transverse bail having a cross rod rotatably extending to engage notches in the forward ends of the plates.

U.S. Pat. Nos. 4,690,364 and 4,754,946 describe devices for restraining a wheelchair in a vehicle while allowing the wheelchair to rotate 360 degrees in its fixed position.

U.S. Pat. No. 4,062,209 describes a locking device for holding a wheelchair in place while a vehicle is in motion. The device comprises a pair of stands having wheel guide arms for receiving a portion of the ground and the hand wheels of a wheelchair, and latches for securing the ground wheels.

An unfilled need exists for a mobile occupant carrier restraint system that is resistant to both front and side impacts, relatively eliminates the need for assistance when docking, and restrains the carrier quickly and securely.

Additionally, other small-sized, wheeled carriers are increasingly being transported, e.g. skooters, all-terrain vehicles, small tractors, and riding lawn mowers. A need exists for a mechanism to secure these carriers into a transport vehicle, e.g., the bed of a truck or trailer.

I have discovered a mobile occupant carrier, restraint device that allows the occupant to perform self-securement in a vehicle. The device is a universal, mobile occupant carrying restraint that may be adapted to fit almost any commercially available, mobile occupant carrier. The device comprises at least one mounted universal adaptor designed to be attached to the frame of an occupant carrier, a bracket assembly having a single, horizontally displaced, latch interface, and a docking station assembly with a single latching mechanism. The universal adaptor(s) may be vertically mounted to the frame to provide vertical adjustment, easy-mounting and dismounting of the bracket assembly, and to provide resistance in collisions. The docking station assembly is mounted to the floor of a transport vehicle in a receiving position and receives the horizontal latch interface. Upon loading a mobile occupant carrier into the transport vehicle, the carrier is moved towards the docking station assembly to a position that allows the single horizontal latch interface to engage the single latching mechanism, thus securing the carrier. The single latch interface allows an occupant to secure a carrier with a greater amount of ease when compared to a dual latch interface because the occupant only has one securing point instead of two. Additionally, the horizontal latch interface assists in resisting any horizontal movement that would be caused by a side impact. Moreover, the wide displacement of the latch interface has a greater resistance to horizontal bending as compared to a vertically displaced latch. The restraint system can also be used to secure other small-size wheeled carriers into a transport vehicle. The device not only secures small-size carriers during transportation, but also serves as a theft deterrent.

The purpose of this invention is to provide a means for fast, self-securement of mobile occupant carriers, particularly wheelchair passengers in transport vehicles, by using a universal docking station and a bracket assembly that can be adjusted to fit almost any carrier frame. Because the interface between the wheelchair and the docking station is horizontally placed, it is capable of resisting force that would be created by either a front or a side collision. The universal adaptor(s) that bolt to the wheelchair frame can optionally function as an anchor for tie-downs in vehicles without docking stations. The bracket assembly size can be adjusted to fit almost any wheelchair frame. The docking station height can also be adjusted to accommodate wheelchairs of various heights. The system can be adapted to secure other small-sized wheeled carriers during transport, including skooters, all-terrain vehicles, small tractors, riding lawn mowers, and a wide variety of other similar carriers.

Figure 1:
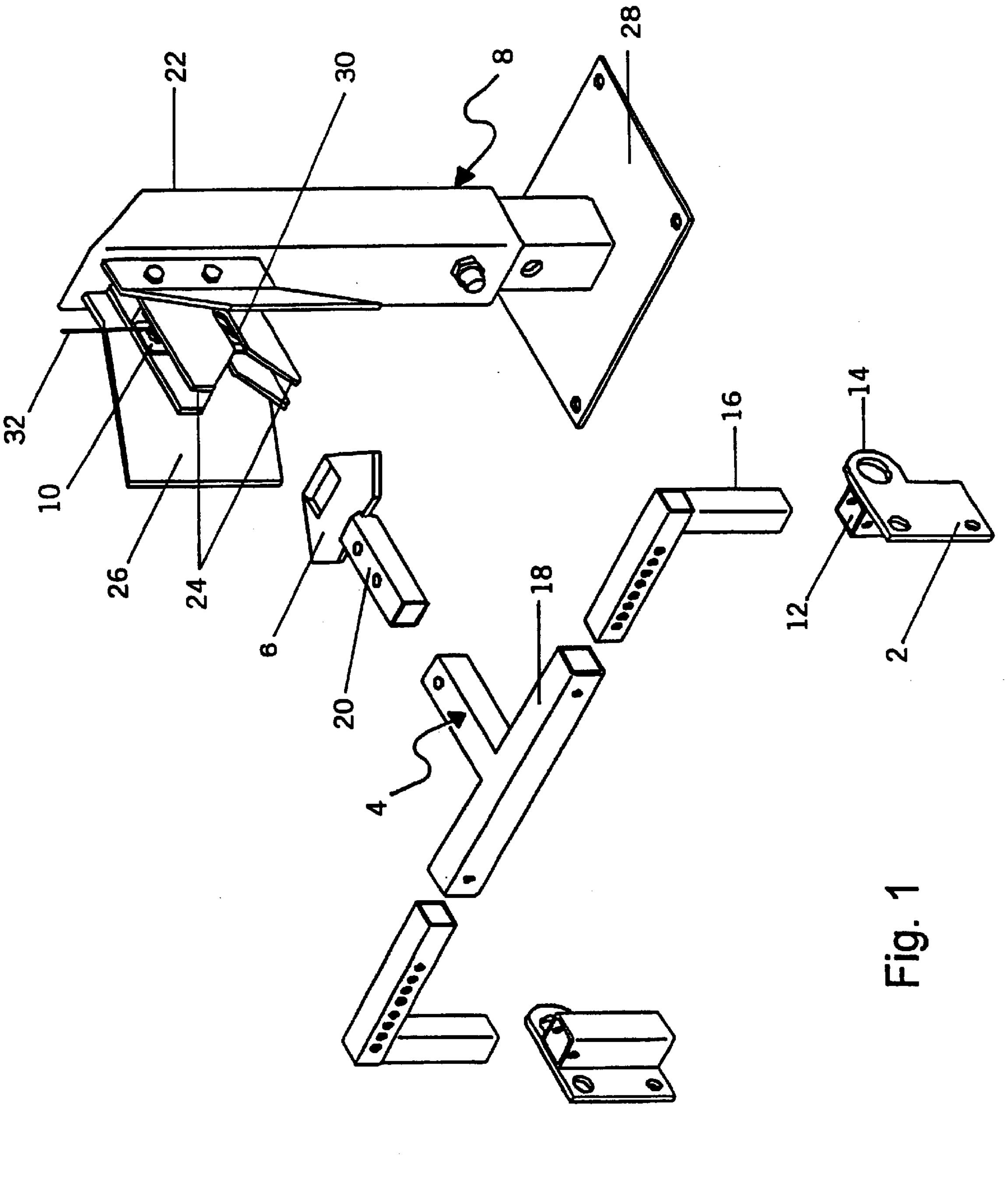
FIG. 1 illustrates a perspective view of one embodiment of the restraint device for a mobile occupant carrier.
Figure 2:
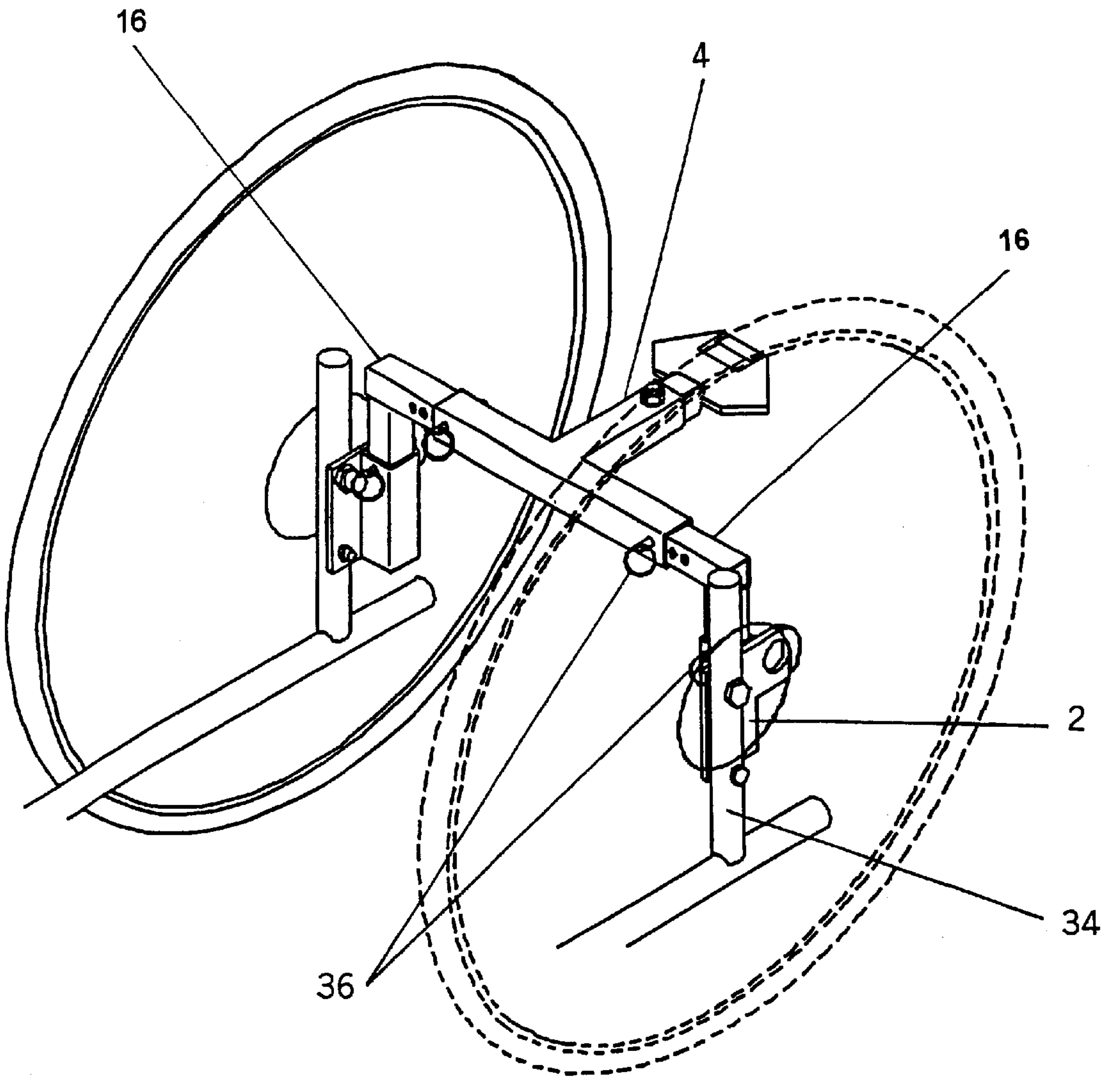
FIG. 2 illustrates a perspective view of one embodiment of the universal adapters attached to the frame of a wheelchair.
Figure 3:
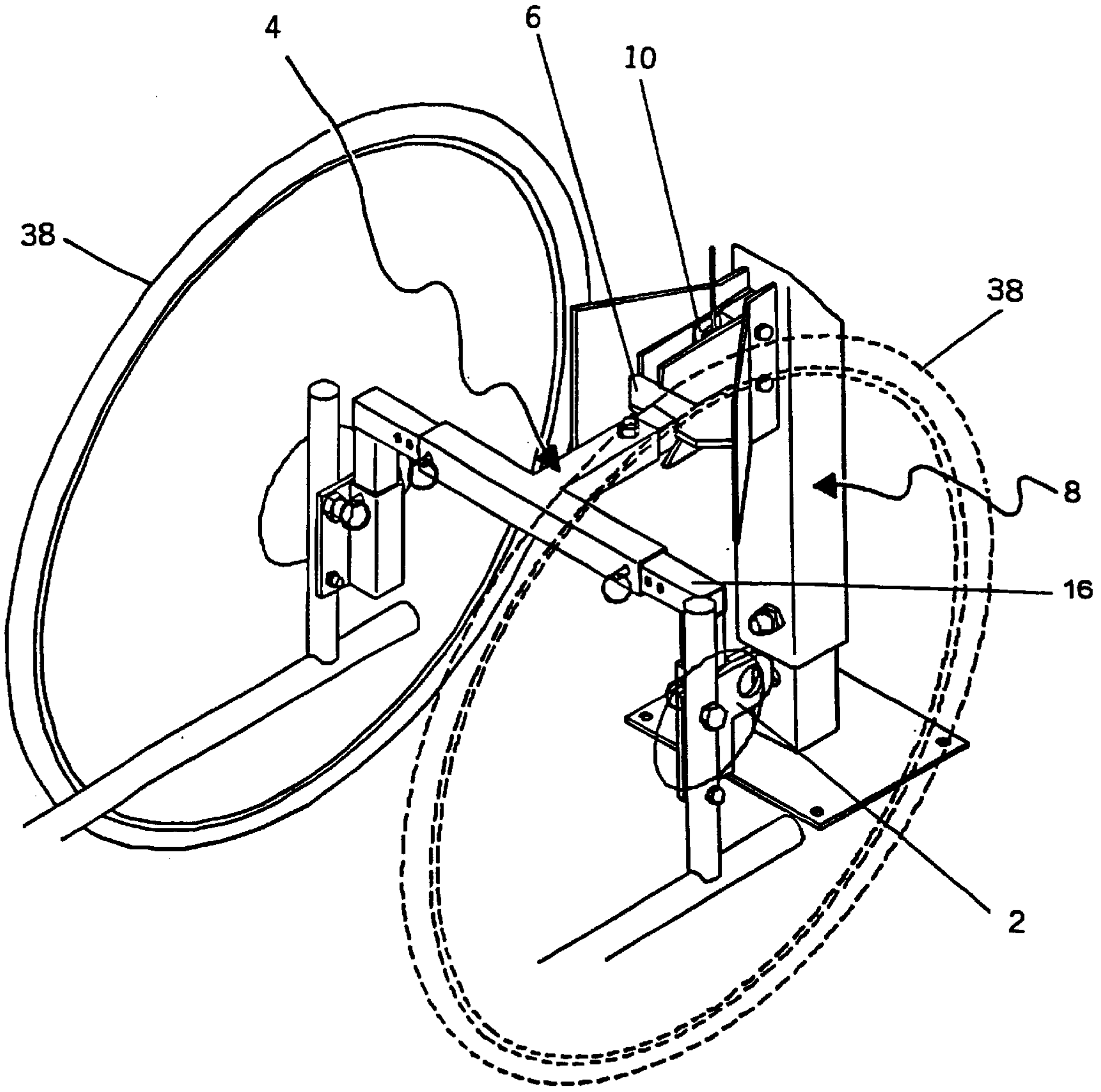
FIG. 3 illustrates a perspective view of one embodiment of the restraint device, showing the bracket assembly connected to the universal adapters and locked in the docking station.

FIGS. 1–3 illustrate the invention. As seen in FIGS. 1–3, one embodiment of the restraint is shown securing a wheelchair in either a passenger, a mass transit, or a transport vehicle. The embodiment in FIG. 1 comprises a pair of universal adaptors 2, which also optionally function as tie-downs, a bracket assembly 4 with a latch interface 6, and a docking station assembly 8 with a latching mechanism 10 to receive the latch interface 6. In this embodiment, the universal adaptors 2 have vertical openings 12 and are mounted near the rear of the occupant carrier, either on a horizontal or a vertical frame member. The vertical openings 12 are sized to allow the L-bars 16 of the bracket assembly 4 to be snugly mounted in a quick fashion. In a preferred embodiment the vertical openings 12 are non-circular to resist rotational movement. At the front end of each of the adaptors 2, there may optionally be an eye-ring 14 to secure the carrier by tie-downs, when not operated in conjunction with the docking assembly 8. For additional safety and restraint, a lap belt can be anchored to the universal adaptors 2.

As illustrated in FIG. 1, the bracket assembly 4 comprises a pair of adjustable L-bars 16, a T-bar 18, and an adjustable latch interface 6 horizontally displaced. The L-bars 16 are adapted to engage the adaptors 2 vertically while engaging the T-bar 18 horizontally. The distance between the L-bar 16 ends that slide into the adaptors 2 can be adjusted to fit the distance between the adaptors 2 on the wheelchair. In a preferred embodiment, the latch interface 6 is hexagonally shaped with a shaft 20 located on the opposite side of the latch device to attach to the T-bar 18. The angular sides of the latch interface 6 help guide it into the latch of the docking station assembly 8.

As illustrated in FIG. 1, the docking station assembly 8 comprises a docking stanchion 22, horizontal V-guides 24, vertical V-guides 26, a latch 10, and a base plate 28. The base plate 28 is secured (e.g., welded, or bolted if removal is necessary) to the floor of a vehicle in a receiving position. The docking stanchion 22 extends upward from the floor. The height of the docking stanchion 22 may be adjusted to accommodate the height of the latch interface 6. The vertical guides 26 guide the latch interface 6, and prevent horizontal movement of the bracket assembly 4 after latching. The horizontal guides 24 guide the latch interface 6 into a horizontal latching slot 30, and limit vertical movement. The width and length of the slot 30 assist in limiting vertical movement by forming a tight fit with the latch interface 6.

FIG. 1 illustrates an embodiment of the latching mechanism 10 containing a manual release lever 32 that allows the occupant to disengage the restraint device. FIG. 1 shows two universal adaptors 2, T-bar 18, and L-bars 16 preferably made of rectangular or square steel. These components could also be tubular steel. In an alternative embodiment, the latching mechanism 10 can additionally include a sensor and an electronic release mechanism (not shown), allowing a remote vehicle driver to monitor a secure latching operation and to electronically release the latch to disengage the wheelchair. Additionally, a single universal adaptor can be used to mount to the frame.

FIG. 2 illustrates a perspective view of one embodiment of the universal adaptors 2 attached to vertical members of a wheelchair frame 34 and engaged by the bracket assembly 4. The spacing between the adaptors 2 is determined by the wheelchair frame. The bracket assembly 4 is adjusted to fit this spacing by adjusting the length of L-bars 16, by aligning holes in the T-bar 18 to the holes in the L-bars 16 and securing with a cotter-pin or bolt 36.

FIG. 3 illustrates a perspective view of one embodiment of the universal docking system with the latch interface 6 inside the latching mechanism 10. The bracket assembly 4 engages the universal adaptors 2 vertically by inserting the L-bars 16 into the vertical openings in the universal adaptors 2. Latch interface 6 is centrally located and extends along a horizontal plane to a position internal of the wheel base 38, allowing the wheelchair to be positioned in close proximity with the docking station assembly 8.

There are several advantages of this docking system for a mobile occupant carrier: (1) the restraint system will withstand a side impact better than the current systems; (2) the bracket assembly 4 is easily attached to the universal adaptors 2, allowing the bracket assembly 4 to be detached from the mobile occupant carrier and kept in the transit vehicle; (3) the docking system guides the latch interface 6 into the latch 10 which simplifies backing a mobile occupant carrier into the latching assembly 10; (4) the bracket assembly 4 prevents a foldable wheelchair from folding when the vehicle is involved in a collision; (5) the universal adaptors 2 can be designed to be used as part of a four-point tie-down system; and (6) the universal adaptors 2 can serve as a securement anchor point for another latch design as long as the device fits snugly into the vertical openings 12.

The universal restraint system can also be used in securing a small-sized, wheeled carrier into a transport vehicle, e.g., a scooter or four-wheeler in the bed of a truck. The system described above can be adapted for use with small-sized, wheeled carriers. An alternative embodiment would be the use of a single universal adapter mounted to the frame of the carrier. Additionally, the horizontal latch interface could be adapted to be directly mounted to the frame without the use of an additional adapter or bracket system. Advantages of the universal restraint system in transporting these small-sized carriers are that the carrier can be driven into the vehicle such that the horizontal latch interface is secured in the latching mechanism; that the height of the docking station can be adjusted to accommodate carriers of different heights; and that the docking station can be removed from the vehicle and stored when not in use.

The complete disclosures of all references cited in this specification are hereby incorporated by reference. In the event of an otherwise irreconcilable conflict, however, the present specification shall control.

I claim:

1. A method to restrain in a vehicle a mobile occupant carrier having a frame, said method comprising:

(a) rigidly mounting to the frame a single planar horizontal latch interface; and (b) removably mounting a docking assembly to the vehicle, wherein said docking assembly comprises a single latching mechanism adapted to engage said single planar horizontal latch interface; and wherein said docking assembly comprises at least two vertical guides adapted to resist horizontal rotation of said horizontal latch interface when said horizontal latch interface is engaged in said latching mechanism; and wherein when said horizontal latch interface is engaged with said latching mechanism, the position of the mobile occupant carrier with respect to the vehicle resists displacement or horizontal rotation should the vehicle be involved in a collision or other vehicular accident.

2. A method as in claim 1, wherein said mobile occupant carrier is selected from the group consisting of small-size wheeled vehicles, skooters, all-terrain vehicles, small tractors, and riding lawn mowers.

3. A method as in claim 1, wherein the engagement of said latching mechanism to said latch interface is adapted to be manually releasable.

4. A method as in claim 1, wherein the engagement of said latching mechanism to said horizontal latch interface is adapted to be electronically monitored.

5. A method as in claim 1, wherein the engagement of said latching mechanism to said horizontal latch interface is adapted to be electronically releasable.

* * * * *